United States Patent
Crawford

(10) Patent No.: US 7,593,501 B2
(45) Date of Patent: Sep. 22, 2009

(54) SEGMENT MAKE-UP SYSTEM AND METHOD FOR MANUFACTURING NUCLEAR FUEL RODS

(75) Inventor: Michael Long Crawford, Benton City, WA (US)

(73) Assignee: AREVA NP Inc., Lynchburg, VA (US)

( * ) Notice: Subject to any disclaimer, the term of this patent is extended or adjusted under 35 U.S.C. 154(b) by 0 days.

(21) Appl. No.: 11/031,576

(22) Filed: Jan. 6, 2005

(65) Prior Publication Data
US 2006/0146974 A1 Jul. 6, 2006

(51) Int. Cl.
*G21C 19/00* (2006.01)
(52) U.S. Cl. .............. 376/261; 376/260; 376/245; 376/248
(58) Field of Classification Search ........ 376/261, 376/260, 245, 248
See application file for complete search history.

(56) References Cited

U.S. PATENT DOCUMENTS

| | | | |
|---|---|---|---|
| 3,735,550 A | | 5/1973 | Moore et al. |
| 3,746,190 A | | 7/1973 | Hotz |
| 3,925,965 A | * | 12/1975 | Rushworth ............ 53/167 |
| 3,940,908 A | | 3/1976 | Dazen et al. |
| 3,965,648 A | | 6/1976 | Tedesco |
| 4,138,821 A | * | 2/1979 | Wilks .................. 33/535 |
| 4,158,601 A | | 6/1979 | Gerkey |
| 4,193,502 A | * | 3/1980 | Marmo ................ 209/555 |
| 4,235,066 A | * | 11/1980 | King et al. ............ 53/500 |
| 4,292,788 A | * | 10/1981 | King .................... 53/500 |
| 4,496,056 A | * | 1/1985 | Schoenig et al. ....... 209/539 |
| 4,532,723 A | * | 8/1985 | Kellie et al. ........... 356/73 |
| 4,680,920 A | | 7/1987 | Vere et al. |
| 4,748,798 A | | 6/1988 | Udaka et al. |
| 4,980,119 A | | 12/1990 | Schoenig, Jr. et al. |
| 5,213,218 A | * | 5/1993 | DiGrande et al. ...... 209/539 |
| 5,251,244 A | * | 10/1993 | Wazybok et al. ....... 376/261 |
| 5,406,044 A | * | 4/1995 | Killian et al. ......... 219/99 |
| 5,565,980 A | * | 10/1996 | Davidson et al. ...... 356/237.2 |

FOREIGN PATENT DOCUMENTS

GB 2394 543 * 4/2004

OTHER PUBLICATIONS

Merriam-Webster's Collegiate Dictionary, tenth edition, 1993, p. 284.*

* cited by examiner

*Primary Examiner*—Rick Palabrica
(74) *Attorney, Agent, or Firm*—Kenyon & Kenyon LLP

(57) ABSTRACT

A method to insert nuclear fuel pellets into a fuel rod cladding tube, having the steps of providing a cladding tube, providing at least one nuclear fuel pellet to be incorporated into the cladding tube, measuring a length of the at least one nuclear fuel pellet with a camera, comparing the length of the at least one nuclear fuel pellet to an expected length, and incorporating the at least one nuclear fuel pellet into the cladding tube when the compared length of the at least one nuclear fuel pellet is within a threshold value of the expected length.

8 Claims, 2 Drawing Sheets

SEGMENT MAKE-UP SYSTEM AND METHOD FOR MANUFACTURING NUCLEAR FUEL RODS

FIELD OF THE INVENTION

The present invention relates to the production of fuel rods for light water reactor nuclear fuel assemblies. More specifically, the present invention provides a segment make-up system and method that is used to incorporate nuclear fuel pellets into nuclear fuel rod clad during the production of nuclear fuel rods for nuclear fuel assemblies.

BACKGROUND INFORMATION

Production of nuclear fuel is often costly and complicated due to the amount of precautionary steps that are required to be undertaken during production of the fuel. In order to produce a safe nuclear fuel, nuclear fuel rods are designed with several different components, each of the components having a specific technical purpose. The innermost component is generally a uranium enriched ceramic material that is shaped in the form of a pellet. Individual pellets are placed end to end in a column. The pellets are then placed inside an elongated rod made of corrosion resistant metal called a fuel clad. The nuclear fuel pellets are loaded into the fuel clad generally according to several technologies. The uranium enriched ceramic material is protected from mechanical and chemical wear by the fuel clad during operation of the reactor. When originally fabricated, the nuclear fuel clad is open (unsealed) at the two ends of the rod. A first lower end piece can be welded onto the clad. The clad is then filled with the nuclear fuel pellets. Lastly, an upper end piece is welded to the remaining open end of the fuel clad thereby forming a completed fuel rod. As a precaution, springs and/or other devices are also included inside the volume encapsulated by the fuel clad to allow the uranium fuel pellets to swell and shift within prescribed limits in the fuel clad. Each completed fuel rod is then stored by the fuel rod manufacturer. A multitude of completed fuel rods are then configured in a parallel arrangement separated by fuel assembly spacers to prevent the fuel rods from contacting each other during use to form a fuel assembly.

The technologies currently used to incorporate the nuclear fuel pellets into the fuel clad have several drawbacks and are therefore not economically efficient. Due to the sensitive nature of the components involved, the production of nuclear fuel rods requires quality assurance checks to ensure that defects do not occur during the production of the nuclear fuel rods. To eliminate human error, many systems and technologies attempt to use automated systems to eliminate worker involvement in the process. Although well intentioned, the automated systems must be carefully designed such that during fabrication of the fuel rod, no loose pieces and/or parts are generated which will jam the machine and stop production. The creation of these automated systems is extremely complicated and the systems created are prone to error due to the inability of designers to accurately predict the failure modes and problems encountered during production of the fuel rods.

In current automated loading systems, nuclear fuel pellets are taken from a fuel pellet elevator and transferred by a conveyor to a segment make-up table. The pellets are loaded and discharged from the fuel pellet elevator with the assistance of a bar code reader which restricts entry and exit of the nuclear fuel pellets from the fuel pellet elevator. The fuel pellets are removed from the fuel pellet tray which carries the pellets and placed on a segment make-up table. The fuel pellets are placed in a parallel orientation and then compacted by a pusher device to form columns of uranium containing ceramic material. The pushing device is connected to a linear variable differential transformer which is configured to provide an electrical output signal. The signal is then read and an overall length of the individual fuel pellet column is determined. A computer then compares an overall design specification for the fuel rod with the output signal obtained from the linear variable differential transformer. If the difference between the expected design value of the nuclear fuel pellet column length and the measured value meets a predetermined threshold value, the fuel rod cladding is then loaded with the nuclear pellet column. If the overall length of the fuel pellet column is outside of the threshold value, the fuel pellets are then rejected from the segment make-up table. A top end cap is then welded the existing open side of the fuel rod cladding thereby completing the nuclear fuel rod.

The automated systems which only use linear variable differential transformers cannot identify damaged fuel pellets which are positioned on the segment make-up table. These automated systems merely check for an overall length of the nuclear material to be incorporated into the clad and do not perform any other quality assurance checks during fabrication of the nuclear fuel rod. Thus, if an individual nuclear fuel pellet is cracked, the cracked fuel pellets will be loaded into the nuclear fuel rod as long as the overall length of the expected nuclear fuel pellet column is within established design parameters. In the case of an irregular shaped fuel pellet, as long as the overall length of the fuel pellet column is within expected overall length parameters, the cracked fuel pellet will be incorporated into the nuclear fuel rod cladding. If the fuel pellet is of an irregular shape, the pellet will bind on the tightly fitting clad and therefore jam the loading operations. An operator must then remove the nuclear fuel pellets from the segment make-up table. The loading apparatus must then be reset and a new fuel tray must be provided to the segment make-up table in order for production of nuclear fuel rods to continue. The unloading of the multiple nuclear fuel pellets from the segment make-up table while in a jammed condition requires numerous manual operations thereby stopping production of nuclear fuel rods. This jamming impedes the overall production capacity of the segment make-up device and severely limits productivity.

An additional drawback of other fuel pellet loading systems is that these systems require continual fine tuning of the linear variable differential transformer systems in order to accurately measure the lengths of the nuclear fuel pellet columns present on the segment make-up table. Large numbers of the linear variable differential transformers are required for the fuel pellet columns on the segment make-up table to provide an accurate measurement of the fuel pellet columns present. There is therefore a need to provide a system which will accurately measure nuclear fuel pellet columns present on a segment make-up table.

There is also a need to provide an apparatus and method which will enable an operator to perform additional quality assurance checks of the nuclear fuel pellets during the manufacturing process of a nuclear fuel rod.

There is a further need to provide an apparatus and method which will allow for incorporation of ceramic materials inside nuclear fuel rod cladding such that the ceramic material is not harmed during the process of incorporating the ceramic materials into the fuel rod cladding.

There is a further need to allow an operator to visually determine which fuel pellets should be included into a defined segment of nuclear fuel rod material such that the incorporation does not degrade the ceramic materials being incorporated into the fuel rod cladding.

SUMMARY

It is therefore an objective of the current invention to provide a system which will accurately measure nuclear fuel pellet columns present on a segment make-up table.

It is also an objective of the present invention to provide an apparatus and method that will enable an operator to perform additional quality assurance checks of the nuclear fuel pellets during the manufacturing process.

It is also an objective of the present invention to allow an operator to visually determine which fuel pellets should be included into a defined segment of nuclear fuel rod material such that pellets of improper uranium concentration or configuration are not loaded into to fuel clad.

The objectives of the present invention are achieved as illustrated and described. The present invention provides a method to insert nuclear fuel pellets into a fuel rod cladding element, comprising the steps of providing the cladding element, providing at least one nuclear fuel pellet to be incorporated into the cladding element, measuring a length of the at least one nuclear fuel pellet with a camera, comparing the length of the at least one nuclear fuel pellet to an expected design length and incorporating the at least one nuclear fuel pellet into the cladding element when the compared length of the at least one nuclear fuel pellet is within a threshold value of the expected design length.

The objectives of the present invention are achieved as illustrated and described in a second method. The second method provides insertion of nuclear fuel pellets into a fuel rod cladding element, the method steps comprising providing the fuel rod cladding element having a bar code on an exterior of the cladding element, reading the bar code on the cladding element, transporting the cladding element to a rod loader input queue, placing the cladding element on separator rollers, the separator rollers configured to separate the clad from each other, lifting the cladding element onto a vibration table, restraining the clad with a rod holding tool, inserting the cladding element into pellet funnels, the pellet funnels configured to accept a fuel pellets and transport fuel pellets into the clad, providing fuel pellets, the fuel pellets stored in pellet vaults, rotating the pellet vaults to a position to allow an operator to manually remove a pellet sheet containing the fuel pellets, manually removing the pellet sheet from the pellet vault containing the nuclear fuel pellets, deploying a segment stop across a segment make-up table to receive nuclear fuel pellets, discharging nuclear fuel pellets from the pellet sheet onto the segment make-up table, the nuclear fuel pellets positioned against the segment stop, pushing the pellets on the table against the segment stop, illuminating a laser to visually identify which of the nuclear fuel pellets should be incorporated into the cladding element, the laser calibrated to precisely visually indicate an expected length of a segment of nuclear fuel pellets to be incorporated into the cladding element, manually removing nuclear fuel pellets not illuminated by the laser from the table, measuring a cumulative length of fuel pellets in rows remaining on the table through the use of a camera, measuring the cumulative length of the fuel pellets in rows on the table through the use of linear variable differential transformers, verifying the cumulative length of the fuel pellets to a design specification of the fuel rod to a correct length, removing fuel pellets from the table which are not verified to the design specification correct length, transferring fuel pellets from the table which have been verified to a vibratory table input queue, and vibratory loading the fuel pellets from the table into the fuel rod cladding.

The objectives of the current invention are also accomplished by a device for loading nuclear fuel pellets into nuclear fuel clad. The device comprises a fuel pellet vault to hold fuel pellet sheets, a segment make-up table to hold fuel pellets, a laser positioned to illuminate the segment make-up table such that the illumination range of the laser corresponds to segment lengths of fuel pellets to be incorporated into the nuclear fuel clad, a camera positioned to obtain data regarding an overall length of fuel pellets positioned on the segment make-up table, a vibratory table configured to vibrate fuel pellets into a fuel clad, a pellet pushing device configured to move fuel pellets from the segment make-up table to the vibratory table, a computer configured to receive the data from the camera and compare the data to a design specification, the computer further configured to indicate to an operator the result of the comparison, an arrangement to handle fuel clad, the arrangement including a rod loader device to accept fuel clad into the arrangement, and a feeding device to feed the fuel clad into a position where the clad can accept fuel pellets from the vibratory table and a pellet funnel arrangement to aid in the transfer of fuel pellets from the vibratory table into the fuel clad.

DETAILED DESCRIPTION

Figure 1:
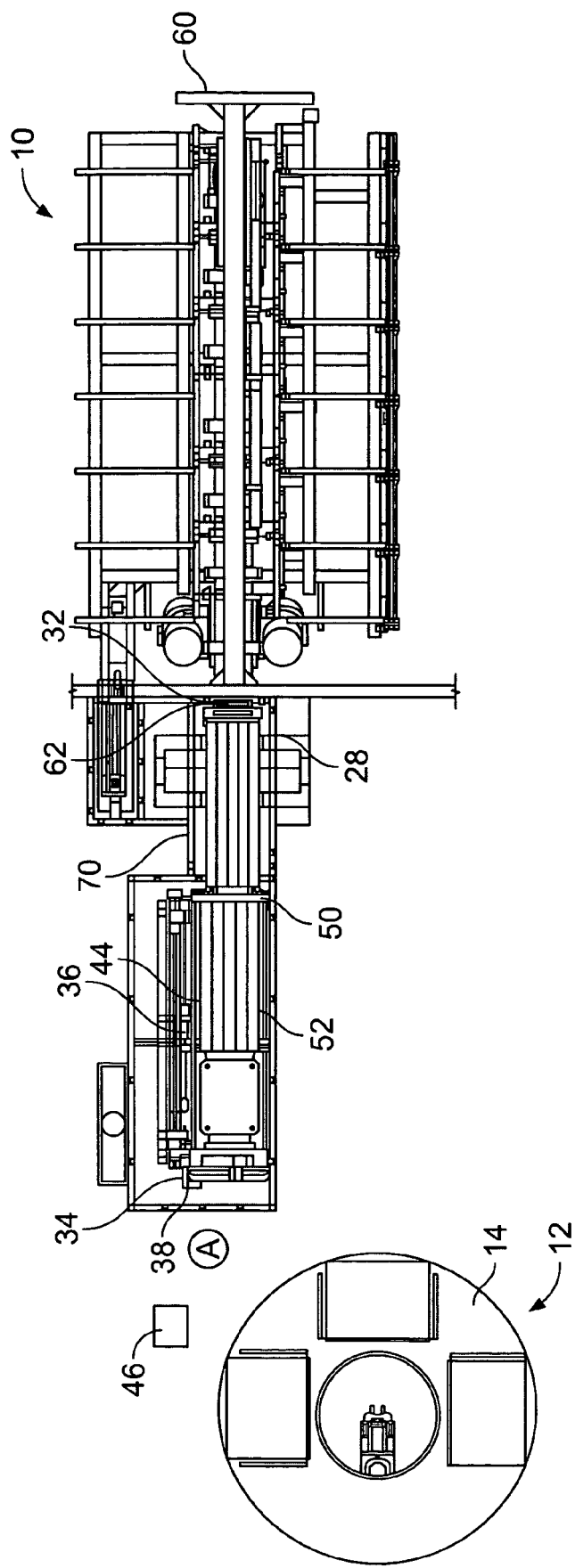
FIG. 1 illustrates an overall plan view of an apparatus to load nuclear fuel elements in fuel rod cladding.
Figure 2:
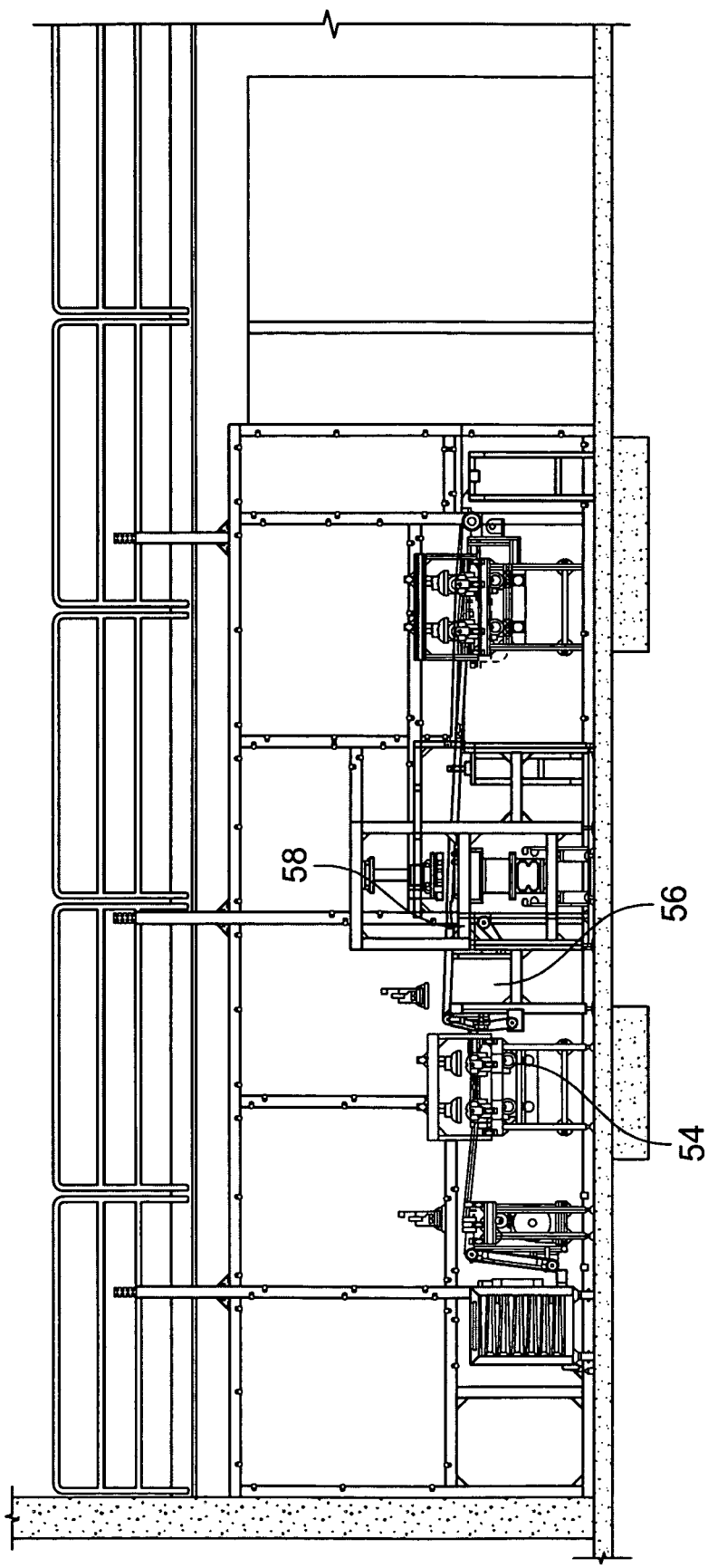
FIG. 2 illustrates a cross-sectional view of a segment make-up system in conformance with the present invention.

Referring to FIGS. 1 and 2, a segment make-up system 10 is illustrated. A fuel pellet vault generally illustrated as element 12 is configured to accept nuclear fuel pellet, from a manufacturing facility. The pellets are placed upon fuel pellet sheets that are individually bar coded. As illustrated in the present invention, fuel pellets that have approximately the same concentration of fissile material are stored in the same fuel pellet vault 12. The fuel pellet vault 12 is in turn placed upon a fuel pellet vault turntable 14. The purpose of the fuel pellet vault turntable 14 is to rotate the supported fuel pellet vaults 12 such that a particular fuel pellet vault 12 is placed before an operator at position A who desires to access nuclear fuel pellets that contain a specified concentration of fissile material. The fuel pellet vault turntable 14 is controlled through an attached computer 46 which spins the turntable 14 to a position where an operator may access the fuel pellet vault 12 which has a specified concentration.

Once the computer 46 issues the order to rotate the turntable 14 and the turntable 14 spins, the operator opens a door to the fuel pellet vault 12 and removes a nuclear fuel pellet sheet which contains the individual nuclear fuel pellets. Generally, the nuclear fuel pellet sheet is configured to support individual columns of fuel pellets such that the fuel pellets remain in place and do not shift during handling of the sheet. The operator manually removes this sheet and places the sheet upon a segment make-up table 44. A pellet pushing device 34 is then activated to unload the pellets provided on the fuel pellet sheet to the segment make-up table 44. The pellet pushing device 34 may include individual spring based elements to contact the columns of fuel elements placed upon the fuel element sheet. The pellet pushing device 34 may also move pellets placed upon the segment make-up table in bulk through the use of a single bar across the entire width of the fuel pellet sheet, the bar actuated through a spring mechanism or an pneumatic cylinder. The pellet pushing device 34 is configured to limit the amount of force exerted on the nuclear fuel pellets to prevent breakage of these pellets during transfer from the fuel pellet sheet to the segment make-up table 44. Although described as individual spring element devices, the pellet pushing device 34 may be any configuration to successfully offload nuclear fuel pellets from the fuel pellet sheet onto the remainder of the segment make-up 10. The pellet pushing device 34 is also configured such that when a nuclear fuel pellet is placed upon the segment make-up table 44, the pellet pushing device 34 slowly moves the nuclear fuel elements to a configuration where nuclear fuel pellets are aligned in a column form in rows 52 on the table 44. A laser 36 is then positioned over the segment make-up table 44 to illuminate the table 44 such that a pre-defined length of the nuclear fuel pellet columns on the table are illuminated. If a nuclear fuel pellet is illuminated by the laser 36 provided on the segment make-up system 10, then the individual fuel pellet should be incorporated into a nuclear fuel rod clad. If the laser 36 does not illuminate the individual fuel pellet, then the individual fuel pellet should not be included in the nuclear fuel element clad. The laser 36 may be located on a movable arm so that the laser 36 may be repositioned per the requirements of the operator. The laser 36 may also be activated by the computer 46 and/or timer to aid in the determination of which fuel pellets should be incorporated into the fuel rod. The laser 36 may be an industrial laser module Stock No. E-55-346 with power supply STK No. E55-323 from Edmund Industrial Optics, Barrington N.J. The laser 36 may be positioned upon a rotary table, such as a Daedel rotary table, CAT. No. 20502RTEPH2C2M1 E1T2 from Olympic Controls Wilsonville, Oreg. The laser may also be placed on a linear table CAT No. 06004CTEPD1L2C4M1E1 from Olympic Controls Wisonville, Oreg. A manual operation is then performed such that excess fuel pellets positioned on the segment make-up table 44 are removed and placed back upon the fuel element sheet. The fuel element sheet may then be removed from the segment make-up table 44 and placed back into the fuel pellet vault 12, thus keeping fuel pellets of like concentrations together. Alternatively, if the fuel pellet sheet is empty, the operator may stack the empty sheet in an empty sheet stack retaining device. The pellet pusher device 34 may also be configured to measure an overall length of the fuel pellet columns placed upon the segment make-up table 44. The pellet pusher device 34 may be actuated through a rodless actuator, for example a high speed ball screw model CAT. No. R4-B32-1518-56-P-BSE with RPS-2 Position Sensor at both ends for example. The overall length of the fuel pellet columns is measured, for example, through the use of a linear variable differential transformer connected to the pellet pusher device 34 and a stop 50 employed across the segment make-up table 44. The stop 50 may be either a fixed horizontal position or may be movable. After illumination of the nuclear fuel pellets by the laser 36, the operator then activates a camera system 38 which is configured to measure the overall length of the nuclear fuel pellet columns remaining upon the segment make-up table 44 through measuring a distance of the overall position of the pellet pusher device 34. The camera 38 may be any configuration or design which will allow an operator to successfully measure or allow an operator to measure an overall length of the fuel element column. A non-limiting example of the camera may be a DVT Legend Series Smartsensor 640×480 Monochrome Imager with L.E.D. No. PKG-540-MR-D. To aid in the analysis of the overall length of the fuel pellet columns, the segment make-up table 44 may be configured to allow light to pass through the table 44, thereby providing a backlighting situation for the pellets on the table 44 or the pellet pushing device may be light from the side for analysis by the camera. The segment make-up table 44 also may be configured with indentations to support the rows of fuel pellets being processed. Portions of the segment make-up table 44, such as the supporting part of the table contacting the fuel pellets may be placed on a roller carriage, to help transport fuel pellets from an entrance point to an exit point off of the supporting part of the table 44. The roller carriage may be, for example, a roller carriage CAT. No. 512P25A1 from Thomson Industries, Fort Washington, N.Y.

The overall length of the fuel element column is measured by the linear variable differential transformer and\or the camera 38 and is then compared to a design specification which contains an expected length of the nuclear fuel pellet column. The comparison of the measured length and the expected length from the design specification is performed by a computer. If the nuclear fuel pellet column is within established tolerances and thresholds for the design, the nuclear fuel pellet column will then be incorporated into the nuclear fuel clad. If the comparison between the measured length of the nuclear fuel pellet column as provided by the linear variable differential transformer and\or the camera 38 is not within the threshold tolerance, the operator is then notified of the discrepancy for remedial action. The notification may be performed through the use of a warning light or computer display. The remedial action taken by the operator may include manually removing pellets from the individual nonconforming fuel pellet column in the event that a nuclear fuel pellet column is considered to be too lengthy. In the case of a nuclear fuel pellet column which is too short compared to design specifications, the operator may add nuclear fuel pellets to bring the overall length of the nuclear fuel pellet column into conformance with the design specification length. In the case of a nuclear fuel pellet column passing the overall length test, the fuel pellet column is then transferred to a vibratory table 28 for inclusion into the nuclear fuel clad.

Individual clad are provided to the segment make-up system 10 such that nuclear fuel elements may be incorporated inside the volume defined by the clad. The individual clad may be inserted into an upset shape welder (USW) a TIG welder or a laser welder and a first end is welded onto the clad. A visual inspection is then carried out on the weld between the clad and the end cap. The visual inspection may include standard non-destructive weld examination techniques, including liquid penetrant tests and radiography as illustrative examples only. If the visual inspection of the weld is satisfactory, the clad is then moved to a rod translation station. Each clad is provided with a bar code to identify the individual fuel rod being manufactured. The bar code on the clad is read through a reading apparatus, such as a bar code scanner 54. The bar code may be placed upon the clad to positively establish a position of the clad by the placement of the bar code on the exterior portion of the clad. The clad is then transported axially to a rod loader input queue 56. As illustrated, the rod loader input queue 56 may store a number of clad units for manufacture. In the current illustrative embodiment of the application, twenty five clad may be stored in the rod loader input queue. Any number of clad units may be stored in the loader input queue 56. The clad are then transported by an elevator and eventually gravity fed down into the remainder of the segment make-up system 10 wherein the clad are held in position by a clad stop. The clad are then placed on separator rollers that transport the clad to a vibratory table input queue 58. The clad are lifted onto the vibratory table 28 for incorporation of the nuclear fuel pellets into the clad. A rod insertion\retraction system 60 then pushes the individual clad onto a rod holding tool 62. The rod holding tool 62 is configured to maintain the clad in position during further processing functions. The rod holding tool 62 is positioned on an exterior portion of the clad in a non-damaging manner to limit overall degradation of the completed fuel rod. Other positions and configurations of rod holding devices may also be used. After insertion of the clad into the rod holding tool 62, pellet funnels 32 are then selected according to the design specification of the nuclear fuel rod being manufactured. The pellet funnels 32 that are selected for use are based upon the overall diameter of the fuel elements being incorporated into the fuel clad. The pellet funnels 32 are made of non-damaging material so that insertion and deletion of the pellet funnels does not degrade the surface of the fuel rods. The pellet funnels 32 have the individual clad inserted into the funnel 32 for transfer of nuclear fuel pellets.

The vibratory table 28 with the nuclear fuel pellets is then activated by the operator causing the nuclear fuel pellet column to vibrate toward the fuel pellet funnel 32. After entering the funnel 32, the pellets are transported down the fuel clad and are stacked in an end to end relationship. After all of the nuclear fuel pellets are incorporated into the fuel clad from the vibratory table 28, the rod holding tool 62 is then released. After releasing the rod holding tool 62, the fuel pellet funnel 32 is removed from the open end of the fuel rod clad. The clad is then discharged from the segment make-up system 10. After discharging the clad from the segment make-up system 10, internal vibration dampers and a gaseous atmosphere may be inserted into the clad prior to second end welding by an upset shape welder. An internal depth of the plenum remaining in the nuclear fuel clad may then be checked at a plenum check station 70 wherein a rod is inserted into the filled fuel clad. If the insertion of the calibrated rod meets expected parameters, the fuel clad is then considered acceptable and may be further processed. If the fuel clad plenum deviates from expected parameters, then the fuel clad is considered potentially defective and is rejected from further processing until expected parameters are achieved.

A second end may be welded on the fuel clad. The second end welding by the upset shape welder is then inspected for defects. If the fuel rod clad is free from defects, the fuel rod may be then incorporated into a nuclear fuel assembly.

The present invention also provides the capability of providing different enrichments of uranium into a single clad, thereby allowing the manufacturer to tailor the reactivity of the fuel rod along the axial length of the completed fuel rod. To accomplish the placement of different enrichments of uranium in a single fuel rod, pellets from differing pellet sheets containing different concentrations of fissile fuel may be added together on the vibratory table in desired sequences. The pellets, after passing the criteria presented above, are then incorporated into the fuel rod clad.

The present invention allows several advantages over other systems for loading nuclear fuel rod clad. The present method and device to load nuclear fuel pellets into fuel clad allows the nuclear fuel pellets to be incorporated into fuel clad in a systematic manner such that the fuel pellets are loaded efficiently and safely. The current invention also allows an operator to visually check whether or not the nuclear fuel pellets provided by the fuel pellet vaults conform to an expected design.

The present invention also provides a configuration that does not damage the fuel pellets during the manufacturing process of the nuclear fuel rod. The use of the vibratory table allows for the incorporation of the nuclear fuel pellets into the nuclear fuel clad without unnecessary stress being placed on the nuclear fuel pellets. Measurements of the overall length of the nuclear fuel pellet columns is performed through the use of a camera, thereby minimizing contact with the uranium containing ceramic fuel pellets. Additionally, the rod holding tool is configured to hold the fuel clad such that damage does not occur to the fuel clad during loading operations. All of these systems ensure a leak tight and contiguous nuclear fuel rod.

Another advantage of the present invention is that the camera used to measure the overall length of the nuclear fuel element column does not need to be continually fine-tuned unlike other systems for loading nuclear fuel elements into cladding. The use of the camera, therefore provides for greater economy in the overall operation of the device described. The camera may also be used to supplement linear variable differential transformer readings in order to more accurately provide quality measurements for the overall length of the nuclear fuel element columns.

The present invention also provides for accurate loading of nuclear fuel allowance into fuel clad without having the drawbacks of creating a jamming condition throughout the segment make-up system. The elimination of error prone systems allows the present invention to operate without having the significant drawbacks of jamming which occurs in other systems previously used. As a consequence, the elimination of jamming conditions allows for continuous production of nuclear fuel rods with minimized down time.

The present invention also eliminates the use of numerous overhead cranes systems to transport fuel clad from processing station to processing station.

The present invention allows fuel clad to be loaded into a rod loading input queue and from this position use gravity during subsequent processing steps. The elimination of numerous lifting devices during the processing of the nuclear fuel clad eliminates the need for expensive maintenance and repair of these systems and provides a more reliable system for processing of the clad.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method to insert nuclear fuel pellets into a fuel rod cladding element, comprising:
   providing a cladding element;
   providing nuclear fuel pellets aligned in a column on a segment make-up table by a pellet pusher device;
   illuminating a predefined length of the column of nuclear fuel pellets with a laser;
   removing any non-illuminated nuclear fuel pellet from the segment make-up table;
   subsequent to the removing step, measuring a length of the column of nuclear fuel pellets with a camera while the column of nuclear fuel pellets is on the segment make-up table, wherein the camera measures the length of the column of nuclear fuel pellets through measuring a distance of an overall position of the pellet pusher device;
   comparing the length of the column of nuclear fuel pellets to an expected design length; and
   incorporating the column of nuclear fuel pellets into the cladding element when the measured length of the column of nuclear fuel pellets is within a threshold value of the expected design length.

2. The method to insert nuclear fuel pellets into a fuel rod cladding element according to claim 1, wherein the step of incorporating the column of nuclear fuel pellets into the cladding element is accomplished through vibrating a table upon which the column of nuclear fuel pellets rests such that the vibration causes the column of nuclear fuel pellets to enter into the cladding element.

3. The method to insert nuclear fuel pellets into a fuel rod cladding element according to claim 1, further comprising the step of an operator manually transferring a nuclear pellet sheet from a fuel pellet vault to the segment make-up table, prior to the step of providing nuclear fuel pellets aligned in a column on a segment make-up table by a pellet pusher device.

4. A method to insert nuclear fuel pellets into a fuel rod cladding element, comprising:
   providing the fuel rod cladding element having a bar code on an exterior of the cladding element;
   reading the bar code on the cladding element;
   transporting the cladding element to a rod loader input queue;
   placing the cladding element on separator rollers, the separator rollers configured to separate the clad from each other;
   lifting the cladding element onto a vibration table;
   restraining the clad with a rod holding tool;
   inserting the cladding element into pellet funnels, the pellet funnels configured to accept fuel pellets and transport the fuel pellets into the clad;
   providing fuel pellets, the fuel pellets stored in pellet vaults;
   rotating the pellet vaults to a position to allow an operator to manually remove a pellet sheet containing the fuel pellets;
   manually removing the pellet sheet from the pellet vault containing the nuclear fuel pellets;
   deploying a segment stop across a segment make-up table to receive nuclear fuel pellets;
   discharging nuclear fuel pellets from the pellet sheet onto the segment make-up table, the nuclear fuel pellets positioned against the segment stop;
   pushing the pellets on the table against the segment stop with a pellet pusher device;
   illuminating a laser to visually identify which of the nuclear fuel pellets should be incorporated into the cladding element, the laser calibrated to precisely visually indicate an expected length of a segment of nuclear fuel pellets to be incorporated into the cladding element;
   manually removing nuclear fuel pellets not illuminated by the laser from the table;
   measuring a cumulative length of fuel pellets in rows remaining on the table through the use of a camera, wherein the camera measures the cumulative length through measuring a distance of an overall position of the pellet pusher device;
   measuring the cumulative length of the fuel pellets in rows on the table through the use of linear variable differential transformers;
   verifying the cumulative length of the fuel pellets, as measured by the camera and the linear variable differential transformers, to a design specification of the fuel rod to a correct length;
   removing fuel pellets from the table which are not verified to the design specification correct length;
   transferring fuel pellets from the table which have been verified to a vibratory table input queue; and
   vibratory loading the fuel pellets from the table into the fuel rod cladding.

5. The method according to claim 4, further comprising:
   releasing the rod holding tool; and
   checking a plenum of the clad.

6. The method according to claim 5, wherein the checking of the plenum of the clad includes inserting a calibrated rod into an open end of the fuel rod clad and reading a length of the plenum.

7. The method according to claim 4, further comprising:
   side lighting the pellet pusher device on the segment make-up table prior to the step of measuring the cumulative length of the fuel pellets in rows remaining on the table through the use of the camera.

8. A method to insert nuclear fuel pellets into a fuel rod cladding element, comprising:
   providing a cladding element;
   providing nuclear fuel pellets aligned in a column on a segment make-up table by a pellet pusher device;
   illuminating a predefined length of the column of nuclear fuel pellets with a laser;
   removing any non-illuminated nuclear fuel pellet from the segment make-up table;
   measuring a length of the column of nuclear fuel pellets with at least one of (a) a camera and (b) a linear variable differential transformer while the column of nuclear fuel pellets is on the segment make-up table by measuring a distance of an overall position of the pellet pusher device;
   comparing the length of the column of nuclear fuel pellets to an expected design length; and
   incorporating the column of nuclear fuel pellets into the cladding element when the measured length of the column of nuclear fuel pellets is within a threshold value of the expected design length.

* * * * *